(12) United States Patent
Nakamura et al.

(10) Patent No.: US 6,856,695 B1
(45) Date of Patent: Feb. 15, 2005

(54) PORTABLE INFORMATION TERMINAL DEVICE USING A SINGLE IMAGING ELEMENT TO PERFORM IDENTITY VERIFICATION

(75) Inventors: Yoshitaka Nakamura, Tokyo (JP); Naoki Hikishima, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 09/703,783

(22) Filed: Nov. 1, 2000

(30) Foreign Application Priority Data

Nov. 4, 1999 (JP) .......................................... 11-313156

(51) Int. Cl.[7] .............................. G06K 9/00; H04M 1/66
(52) U.S. Cl. ..................... 382/124; 455/410; 455/575.3; 379/93.03; 379/433.13
(58) Field of Search .................................. 455/410, 411, 455/556.1, 556.2, 557, 558, 585.3; 379/93.02, 93.03, 110.01, 207.13, 433.1, 433.11, 433.12, 433.13; 382/115, 116, 124, 125, 126, 127, 313

(56) References Cited

U.S. PATENT DOCUMENTS

| | | | | | |
|---|---|---|---|---|---|
| 5,680,205 | A | * | 10/1997 | Borza | 356/71 |
| 6,069,648 | A | * | 5/2000 | Suso et al. | 348/14.02 |
| 6,088,585 | A | * | 7/2000 | Schmitt et al. | 455/411 |
| 6,104,922 | A | * | 8/2000 | Baumann | 455/410 |
| 6,177,950 | B1 | * | 1/2001 | Robb | 348/14.01 |
| 6,181,381 | B1 | * | 1/2001 | Evans | 348/333.01 |
| 6,249,672 | B1 | * | 6/2001 | Castiel | 455/575.4 |
| 6,308,084 | B1 | * | 10/2001 | Lonka | 455/556.1 |
| 6,424,845 | B1 | * | 7/2002 | Emmoft et al. | 455/575.1 |
| 6,466,202 | B1 | * | 10/2002 | Suso et al. | 345/169 |
| 6,473,631 | B1 | * | 10/2002 | Siddoway et al. | 455/575.1 |
| 6,532,035 | B1 | * | 3/2003 | Saari et al. | 348/14.02 |

FOREIGN PATENT DOCUMENTS

| | | |
|---|---|---|
| JP | 63-272249 | 11/1988 |
| JP | 6-309447 | 11/1994 |
| JP | 6-309448 | 11/1994 |
| WO | WO 97/26744 | 7/1997 |
| WO | WO 98/08184 | 2/1998 |

OTHER PUBLICATIONS

Japanese Office Action dated Sep. 24, 2002 with English translation.

* cited by examiner

Primary Examiner—Jingge Wu
Assistant Examiner—Ryan J. Hesseltine
(74) Attorney, Agent, or Firm—Dickstein, Shapiro, Morin & Oshinsky, LLP

(57) ABSTRACT

A portable information terminal device comprising: an enclosure of the portable information terminal device, an imaging element provided within the enclosure, a first lens provided within the enclosure for the imaging element, a second lens, which focal length is shorter than that of the first lens, provided within the enclosure for the imaging element, a lens selection means, provided within the enclosure, for selecting one of the first lens and the second lens so that a focal point of a selected lens is at the imaging element, and a transparent plate for pressing a tip of a finger of a user of the portable information terminal device, wherein the imaging element captures a fingerprint of the tip of the finger on the transparent plate by the second lens selected by the lens selection means.

10 Claims, 10 Drawing Sheets

PORTABLE INFORMATION TERMINAL DEVICE USING A SINGLE IMAGING ELEMENT TO PERFORM IDENTITY VERIFICATION

BACKGROUND OF THE INVENTION

1. Field of the Invention

The invention relates to a portable information terminal such as a portable telephone or portable personal computer, which is portable and capable of communication.

2. Related Art

There has been rapid growth in the use of cellular telephone and PHS telephones (Japan's Personal Handyphone System), to the extent that virtually everyone will have his or her own telephone. With this growth there have been advancements in the sophistication of functions provided, and an increase in the speed of communication, so that whereas portable telephones were limited to voice communication, it has become possible to exchange image information as well. By doing this, it is possible to use a pair of portable telephones as television telephones, which enable observation of a screen while making a call.

The above-noted applies as well to a compact portable computer having a communication function. The present invention, unless otherwise noted herein, shall collectively refer to these devices as portable information terminals.

In this type of portable information terminal, by the very fact that it is portable, it is at risk of being stolen or used without permission. Under these conditions, if a person uses a portable information terminal without permission, the proper owner is billed for the telephone charges. Additionally, internal mail software can be used to send mail as if it were being sent by the rightful owner, and to improperly read stored mail intended for the rightful owner of the portable information terminal.

From the standpoint of security, there is prior art for verification of the proper identity of the user. For example, in the Japanese unexamined Patent Publication (KOKAI) No. 6-309448, there is disclosure of technology for using a retinal pattern or fingerprint to identify a proper user.

FIG. 12 to FIG. 14 show the technology disclosed in the above-noted Japanese unexamined Patent Publication. As shown in FIG. 12, when identifying the face of a proper user 10, a light path is formed via first lens 11, a first mirror 12, and a second lens 13, and image information of a face 10 is formed at an imaging element 14 disposed at the focal point of the second lens 13. When checking a fingerprint to see if it is of the proper user, the image of the tip of a finger that is pressed up against one surface of a fingerprint prism 16 strikes the second lens 13 via a fingerprint mirror 18, and is formed as an image on the imaging element 14. The fingerprint mirror 18 rotates through an angle of 90° about a pivot 19, and in the condition in which fingerprint is being checked, light rays reflected from the first mirror 12 are blocked, so that they do not strike the second lens 13. According to this optics system, it is possible to select verification of either the face 10 or the finger 17 of the subject.

In FIG. 13, in which elements the same as i. FIG. 12 are assigned the same reference numerals, the first mirror 12 is movable, the movement position of which being used to perform switching of the optical image of either the face 10 or the finger 17, the light from which is caused to strike the second lens 13. According this optics system, it is possible to verify the proper user by selectively verifying either the face 10 or the finger 17.

In FIG. 14, the imaging element 14 can be rotated so as to be disposed at either a first rotational position or a second rotational position, and the second lens 13 moves along the light axis of the imaging element 14 in concert with this rotation. When the imaging element is positioned at the first position, a second mirror 21 forms an image of the finger 17 onto the imaging element 14, and when the imaging element 14 is positioned at the second position, the first mirror 12 forms an image of the face 1t on the imaging element 14. In the Japanese unexamined Patent Publication No. 63-272249, there is disclosure of technology whereby verification of identity is done by reading a face using an imaging element.

In this technology, because verification is possible using the face, without using a fingerprint, the system is perceived by the subject as being easy to use.

In the technology disclosed in the Japanese unexamined Patent Publication (KOKAI) No 6-309448, the optical images of the face 10 and the finger 17 are switched so as to use these images to identify a user. Therefore, compared the technology disclosed in the Japanese unexamined Patent Publication No 63-272249, in which a face is read by an imaging element to perform verification, there is the advantage of being able to perform verification by means of fingerprint, in cases such as when the subject is wearing glasses or is disguised.

As shown in FIG. 12 to FIG. 14, however, in the technology disclosed in the Japanese unexamined Patent Publication (KOKAI) No. 6-309448, the use of a mirror is required. Although a mirror having a reflective coating on the rear surface is inexpensive, with this type of mirror reflections occur not only at the rear surface, but at the front surface as well. For this reason, in order to achieve a highly accurate image usable for verification of a fingerprint or a face, it is necessary to coat the front surface of the mirror, so as to prevent double reflections. This special type of mirror, however, is expensive, and the coated front surface of the mirror is exposed to the outside, so that it can be damaged. If the mirror coating becomes damaged, there is the problem of not being able to reliably obtain a highly accurate image of a face or fingerprint.

When performing verification using both a face and a fingerprint, it is necessary to provide reference patterns for both images, thereby adding the problem of an increase in the memory capacity for storing the reference patterns.

Accordingly, it is an object of the present invention to provide a portable information terminal, which, without using a mirror, uses a single imaging element and enables simple setting of two different subject positions.

It is a further object of the present invention to provide a portable information-terminal, which, without using a mirror, uses a single imaging element to perform verification identity, utilizing a part other than the face.

SUMMARY OF THE INVENTION

In order to achieve the above-noted objects, the present invention adopts the following basic technical constitution.

Specifically, a first aspect of the present invention is a portable information terminal device comprising: an enclosure 170 of the portable information terminal device, an imaging element 143 provided within the enclosure 170, a first lens 142 provided within the enclosure 170 for the imaging element 143, a second lens 142, a focal length of which is shorter than that of the first lens 141, provided within the enclosure 170 or the imaging element 143, a lens selection means 180, provided within the enclosure 170, for selecting one of the first lens 141 and the second lens 142 so that a focal point of a selected lens is established at the imaging element 143, and a transparent plate 122 to which a tip of a finger 131 of an user of the portable information terminal device is attached, wherein the imaging element 143 captures an image of a fingerprint of the tip of the finger 131 on the transparent plate 122 by the second lens 142 selected by the lens selection means 180.

That is, in the first aspect of the present invention, two lenses having mutually different focal lengths are provided in a portable information terminal having a single imaging element, one of these two lenses being selected so as to form an image on the imaging element, so as to acquire images, using a single imaging element, of different subjects, such as a scene or a finger.

A second aspect of the present invention is a portable information terminal device comprising: a first enclosure 104 and a second enclosure 109 of the portable information terminal device freely openable and closable about a hinge mechanism 102, an imaging element 143 provided within the first enclosure 104, a first lens 141 provided within the first enclosure 104 for the imaging element 143, a second lens 142, a focal length of which is shorter than that of the first lens 141 provided within the first enclosure 104 for the imaging element 143, a lens selection means 180, provided within the first enclosure 104, which, in response to an opening and a closing operation of the first and second enclosures 104,109, selects one of the first lens 141 and the second lens 142, so that, in an open condition a focal point of the first lens 141 is established at the imaging element 143, and in a closed condition a focal point of the second lens 142 is established at the imaging element 143, and a transparent plate 122, provided on the second enclosure 109, to which a tip of a finger 131 of an user of the portable information terminal device is attached, wherein the imaging element 143 captures an image of a fingerprint of the tip of the inger 131 on the transparent plate 122 by the second lens 142 selected by the lens selection means 180.

In the present invention according to the second aspect, the first and second lenses move automatically in concert with the opening and closing of the first and second enclosures, so that the corresponding first and second lenses are positioned in opposition to the imaging element.

A third aspect of the present invention is a portable information terminal device comprising: a first enclosure 104 and a second enclosure 109 of the portable information terminal device freely openable and closable about a hinge mechanism 102, an imaging element 143 provided within the first enclosure 104, a first window 113 provided on a front surface of the second enclosure 109 for the imaging element 143 and having a keyboard 190 thereon, a first lens 141 provided within the first enclosure 104 for the imaging element 143, a second lens 142, a focal length of which being shorter than that of the first lens 141, provided within the first enclosure 104 for the imaging element 413, a second window 107 provided on a front surface 104a of the first enclosure 104, the front surface 104a thereof being opposite to the front surface 109a of the second enclosure 109, when both of the enclosures being attached to each other, and a transparent plate 122, to which a tip of a finger 131 of an user of the portable information terminal device is attached, being positioned on a back surface of the second enclosure 109 so as to oppose to the first window 113, wherein the transparent plate 122, the first window 113, the second lens 142 and the imaging element 143 are arranged in one raw, when the first and the second enclosures 104,109 are contacted each other to form a closed condition.

A fourth aspect of the present invention is a portable information terminal device comprising: an enclosure 310 of the portable information terminal device, an imaging element 305 provided within the enclosure 310, a first lens 303 provided within the enclosure 310 for the imaging element, a second lens 307 for the imaging element, a focal length of which being shorter than that of the first lens 305 and provided within the enclosure 310, a first window 301 for the first lens 303 and provided on a surface 310a of the enclosure 310, a second window 302 for the second lens 307 and provided in a vicinity of the first window 301, and an imaging element rotating means 320, which sets a rotation angle of the imaging element 305 at either a first angle A1 or a second angle A2, so as to set a focal point of either one of the first lens 303 or the second lens 307 at the imaging element 305, wherein the imaging element 305 captures an image of the fingerprint of the tip of the finger 311 pressed on either the first window 301 or the second window 302 set by the imaging element rotating means 320.

That is, in the fourth aspect of the present invention, an imaging element is set to either the first angle or the second angle, thereby changing the light axis, so as to accommodate objects at two distances, using the first or the second lens.

In a fifth aspect of the present invention, the first lens 141 is a lens for forming an image of an object disposed outside the first enclosure 104 onto the imaging element 143.

That is, by using the fifth aspect of the present invention, the first lens is used to acquire the image of an object which is relatively far from the enclosure.

A sixth aspect of the present invention is a portable information terminal device comprising a pattern comparison means (S206,S205 in FIG. 8) which compares a pattern of the fingerprint captured by the imaging element 143 with a pattern stored prior in a memory 174, and a releasing means (S209 in FIG. 8) which, only when the pattern comparison means detects that the patterns coincide with each other, releases a prohibition on processing of a prescribed signal processing operation.

That is, according to the sixth aspect of the present invention, comparison is performed between the pattern of an object disposed on the transparent plate with a priorly stored pattern, and, if the patterns coincide, a prescribed signal processing function of the portable information terminal is enabled, thereby prohibiting use of the terminal by anyone but the proper user.

BRIEF DESCRIPTIONS OF THE DRAWINGS

DETAILED DESCRIPTION OF THE PREFERRED EMBODIMENTS

Preferred embodiments of the present invention are described in detail below, with references made to relevant accompanying drawings.

Figure 1:
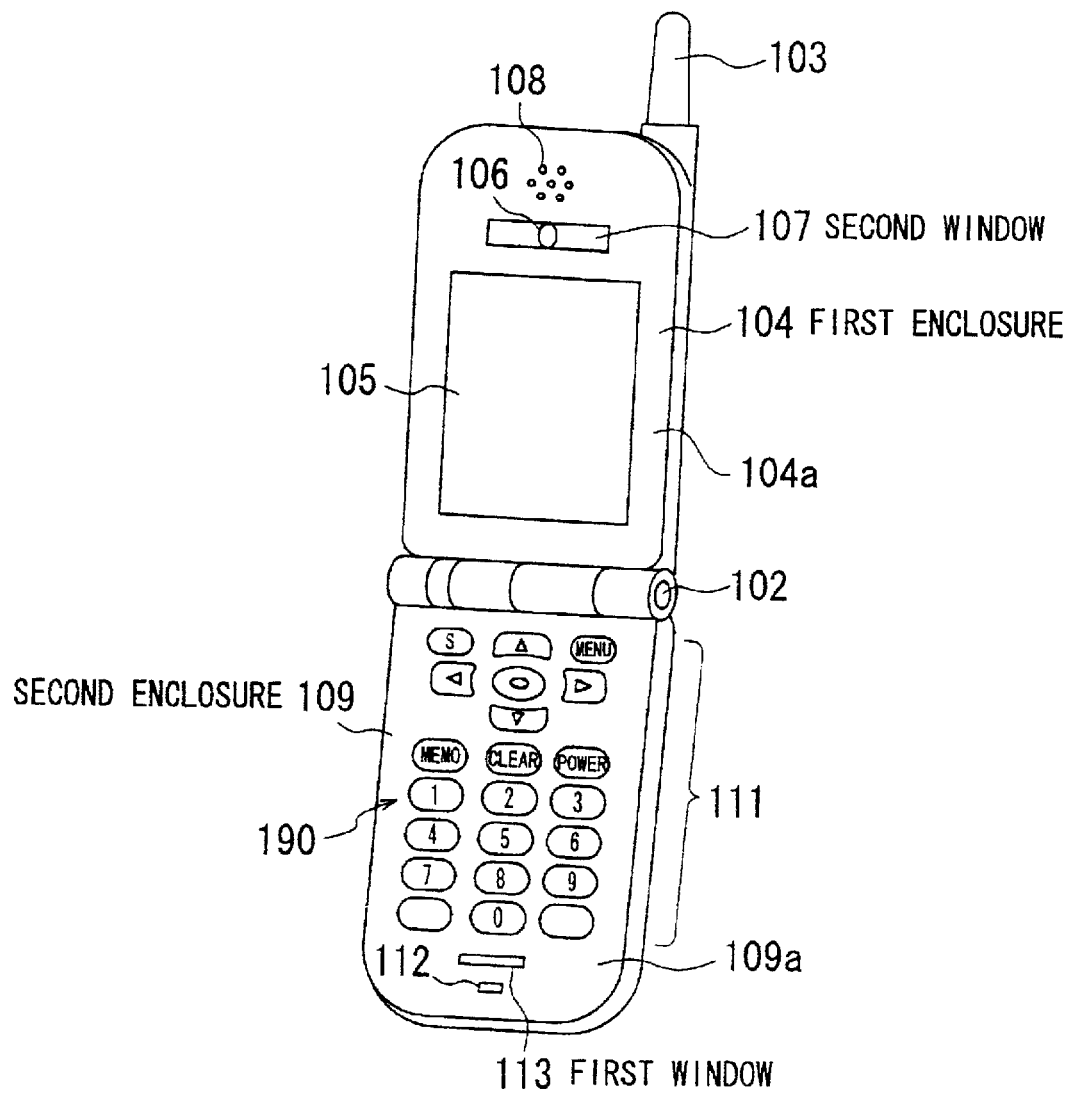
FIG. 1 is a perspective view showing a portable telephone according to a first embodiment of the present invention, in the opened condition.

Specifically, FIG. 1 shows the outer appearance of a portable telephone used as a portable information terminal device according to a first embodiment of the present invention, this being shown in the condition in which it is used. This portable telephone 101 is configured to enabling folding in half, about a hinge mechanism 102. The surface of the upper body part 104 of the portable telephone 101, to which is attached an antenna 103, that is shown in the drawing has disposed thereon a display 105 made of a liquid-crystal display, at the top of which is disposed a glass plate 107 for the purpose of viewing by an imaging lens 106, and a speaker 108. The imaging lens 106 is used, for example, in obtaining images or people and surroundings for teleconferences, and for photographing fingerprints. The surface of the lower body part 109, which is linked to the upper body part 104 via the hinge mechanism 102, which faces the upper part 104 has various button switches 111 for performing dialing and the like and a microphone 112. Just above the microphone 112 is located a transparent glass plate 113, at a position on the lower body part 109 that is just opposite the imaging lens 106 when the portable telephone is folded. This glass plate 113 is provided for the purpose of causing input of a fingerprint image to the imaging lens 106 when the portable telephone is folded.

Figure 2:
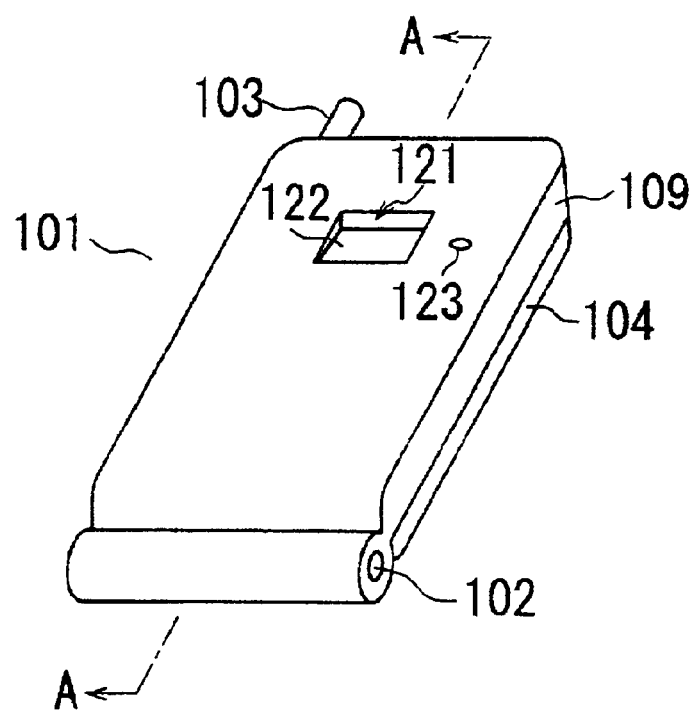
FIG. 2 is a perspective view showing a portable telephone according to the first embodiment of the present invention, in the folded condition.
Figure 3:
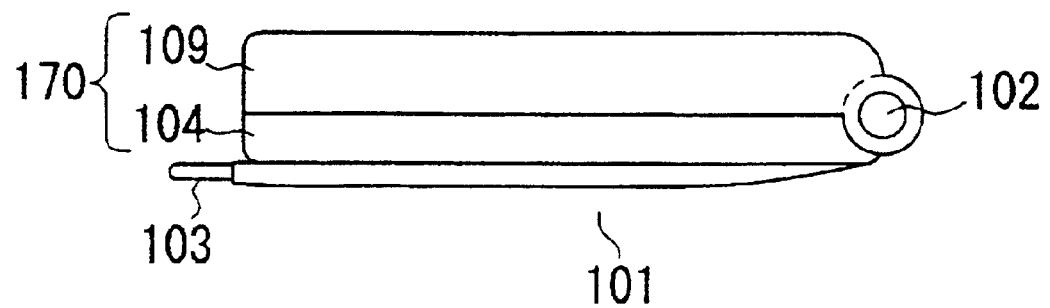
FIG. 3 is a side view of a portable telephone according to the first embodiment of the present invention, in the folded condition.

FIG. 2 shows the portable telephone of FIG. 1 in the folded condition. On the rear surface of the lower body part 109 of the portable telephone 101 having button switches 111 (FIG. 1) is formed a depression 121, into which is assembled a clear glass plate 122. By pressing the tip of a finger lightly up against the transparent plastic plate 122, the image of the fingerprint thereof is read in. A light-emitting diode (LED) 123 is disposed in proximity to the depression 121. This LED 123 displays the timing of reading the fingerprint by the light emitted therefrom. FIG. 3 is a side view of the portable telephone 101 in the folded condition.

Figure 4:
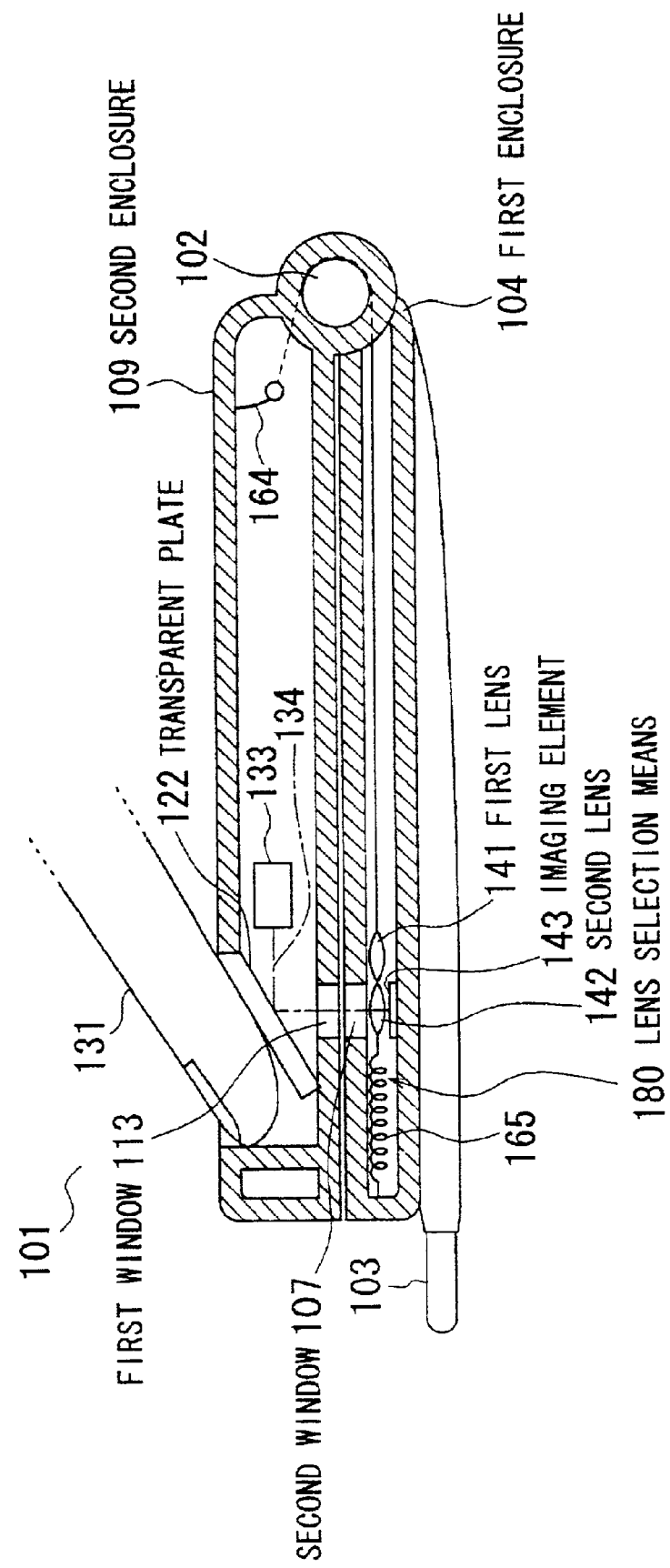
FIG. 4 is cross-sectional view showing the portable telephone of FIG. 2, cut along the line A—A.

FIG. 4 is a side cutaway view of the portable telephone of FIG. 2 cut along the line A—A of FIG. 2. This view corresponds to FIG. 3, but shows the condition in which the user has inserted a finger into the depression 121 shown in FIG. 4 for the purpose of verification of the user of the portable telephone 101. The transparent plastic plate 122 disposed at an inclination inside the lower body part 109 is configured so that a light beam 134 from the light-emitting diode 133 is released therefrom, via a light-collection lens (not shown in the drawing). The released light beam 134 strikes the fingerprint that is pressed up against the transparent plastic plate 122. The image of the fingerprint that is the object being captured passes through two glass plates 113 and 107, and enters the upper body part 104.

Inside the upper body part 104 are located the first and second lenses 141 and 142, so as to be movable in a direction substantially the same as the axis of the antenna 103. When the portable telephone 101 is folded, as shown in FIG. 4, the second lens 142 is disposed at a position that is opposite the glass plate 107, so that the fingerprint image passes through the second lens 142 and is formed as an image onto the imaging element 143 disposed therebehind.

Figure 5:
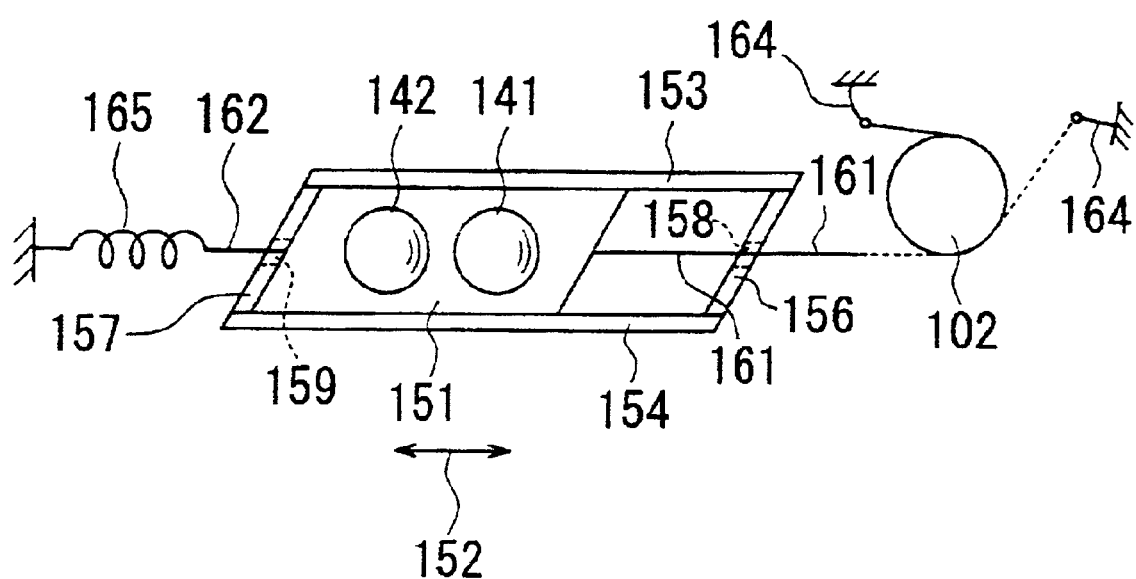
FIG. 5 is a drawing illustrating the principle of the lens movement mechanism of the first embodiment of the present invention.

FIG. 5 is a drawing showing the principle of the lens movement mechanism (lens selection means). The first and second lenses 141 and 142 are formed on a single rectangular plastic plate 151. This plastic plate 151 is placed so as to be guided by two rails 153 and 154 disposed with a prescribed spacing therebetween along the direction of movement 152 of the lenses 141 and 142. Stoppers 156 and 157 are mounted to each end of the two rails 153 and 154, so as to limit the movement of the plastic plate 151. Small holes 158 and 159 are formed in the center portions of the stoppers 156 and 157, respectively, and wires 161 and 162 are inserted into each of the holes 158 and 159.

As shown in FIG. 4, the first wire 161 has one end thereof mounted to the lens 141 side of the plastic plate 151, and the other end thereof passing along the outer periphery of the lens movement mechanism 102 and mounted to a piano wire 0.164, the other end of which is mounted to the lower body part 109. The second wire 162 has one end thereof mounted to the lens 142 side of the plastic plate 151, and the other end mounted to one end of a spring 165, the other end of the spring 165 being fixed to the enclosure of the upper body part 104.

Figure 6:
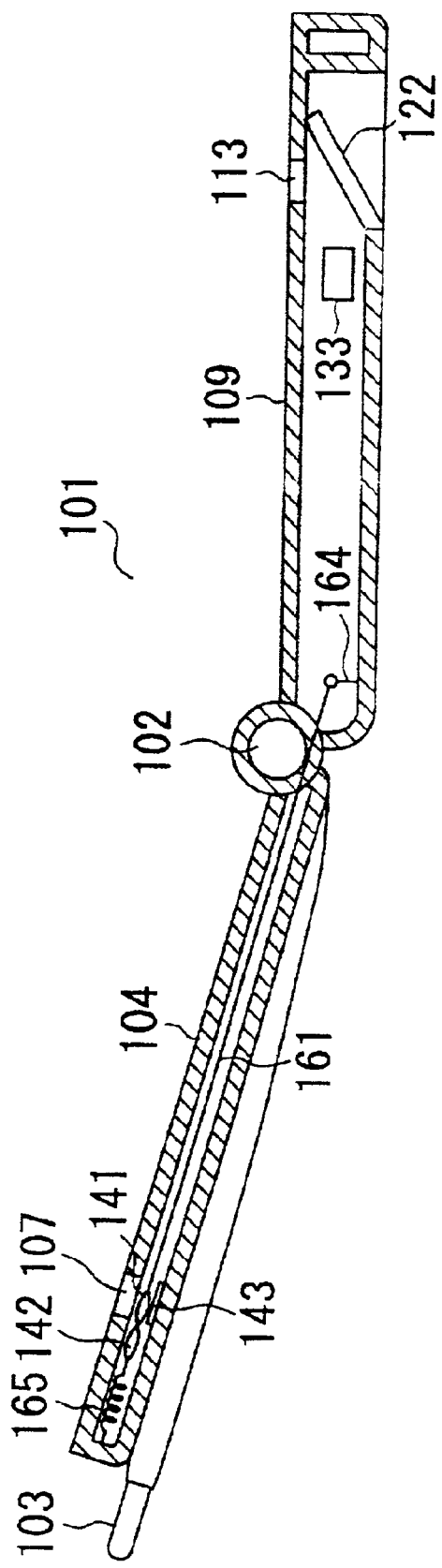
FIG. 6 is a cross-sectional view showing the main parts of the portable information terminal of the first embodiment of the present invention, in the open condition when used.

FIG. 6 is a drawing showing the main parts of the portable telephone of this embodiment, in the condition in which it is used. As shown in this drawing, when the upper body part 104 and the lower body part 109 of the portable telephone 101 are opened to substantially an angle of 180°, compared with the condition in which the portable telephone 101 is folded (FIG. 4), the length of the first wire 161 in contact with the outer periphery of the center shaft of the hinge mechanism 102 is shortened. When this occurs, the compression force of the spring 165 causes a commensurate movement of the plastic plate 151 shown in FIG. 5 toward the spring 165, so that the plastic plate 151 is positioned in contact with the stopper 157, this being the condition shown in FIG. 5. In this condition, as shown in FIG. 6 the first lens 141 is located at a position that is opposed to the glass plate 107. The first lens 141 is a convex lens with a relatively long focal length, and can be used to form an image onto the imaging element 143 (FIG. 4) of the person speaking on the telephone or the surrounding background.

In contrast to the above, when the portable telephone 101 is folded, as shown in FIG. 4, compared with condition in which it is opened, the length of the first wire 161 in contact with the outer periphery of the center shaft of the hinge mechanism 102 is lengthened, so that the first wire 161 moves in the opposite direction to oppose the tension of the spring 165 to extent of the increase in takeup amount, the result being that one end of the plastic plate 151 comes into contact with the stopper 156 thereby positioning it. The piano wire 164 is used as a spring member that absorbs any further pulling force. In this condition, the second lens 142 is positioned opposite the glass plate 107, as shown in FIG. 4. The second lens 142 is a short focal length lens or a macro lens, and can thus be used for capturing an image of a fingerprint of a finger 131 pressed up against the plastic plate 122.

Thus, in the portable telephone 101 of this embodiment, when the portable telephone is in the folded condition, it possible to obtain an image of a fingerprint, and when the portable telephone 101 is opened, it is possible to obtain an image of a face or surrounding scenery or the like.

As described above the lens selection means 180 comprises at least the plastic plate 151, the first lens 141 and the second lens 142 provided on the plastic plate 151, wires 161, 162 mounted to the plastic plate 151, the spring 165 mounted to the one end of the wire 162, the stoppers 156,157 of the plastic plate 151.

Figure 7:
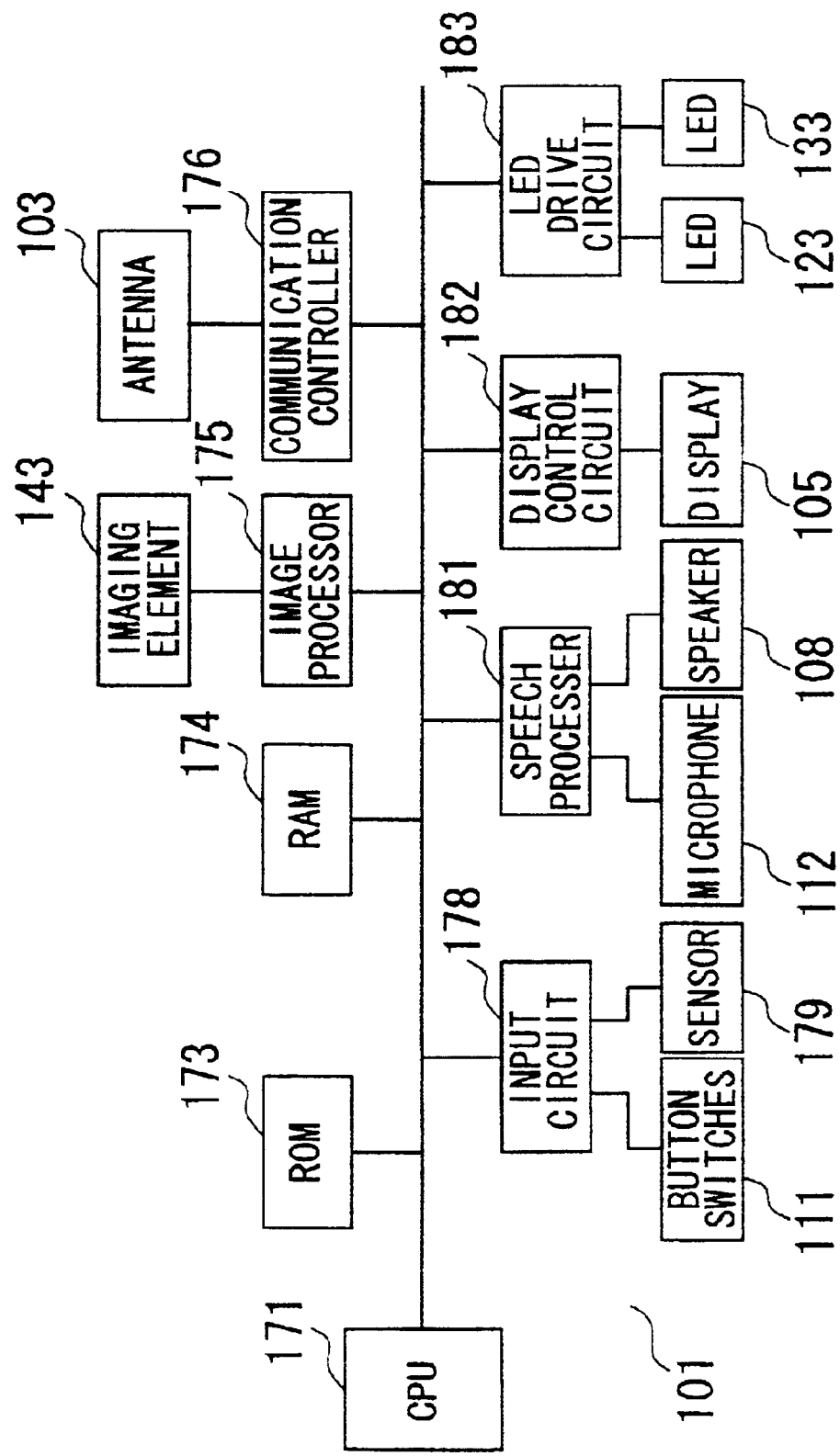
FIG. 7 is a block diagram of a portable telephone according to the first embodiment of the present invention.

FIG. 7 shows the block diagram of a portable telephone according to this embodiment. This portable telephone 101 has a CPU (central processing un-t) 171 which serves as a central element in performing various control of the portable telephone 101. The CPU 171 is connected to various circuit blocks within the portable telephone via a data bus 172 and the like. Of these parts, a ROM 173 is a read-only memory used for storage of a program for performing control of various parts of the portable telephone 101, and patterns for verification of fingerprints. A RAM (random-access memory) 174 is used as a working memory for execution of a program. An image processor 175 is a circuit that captures and processes an image output from the two-dimensional image processor comprising the imaging element 143 shown in FIG. 4. This circuit includes an A/D (analog/digital) converter and a compression circuit that compresses the digital signal converted by the A/D converter (not shown in the drawing). A communication controller 176 is a circuit that performs communication with a radio station (not shown in the drawing), via the antenna 103, and includes modulation and demodulation circuits, for example.

An input circuit 178 is connected to various button switches 111 and a sensor 179, and transfers signals input therefrom to the bus 172. The sensor in this case is disposed in proximity to the plastic plate 122 shown, for example, in FIG. 4, to detect pressure on the plastic plate 122. A speech processing circuit 181 is provided to perform processing of a voice input via the microphone 112 and connected to the speaker 108, and more specifically the speech processing circuit 181 includes an A/D converter, a D/A converter and an amplifier. A display control circuit 182 is used to control the display 105. An LED drive circuit 183 controls a guide LED 123 used as a guide when checking a fingerprint, and a LED 133 for light up the finger 131.

Figure 8:
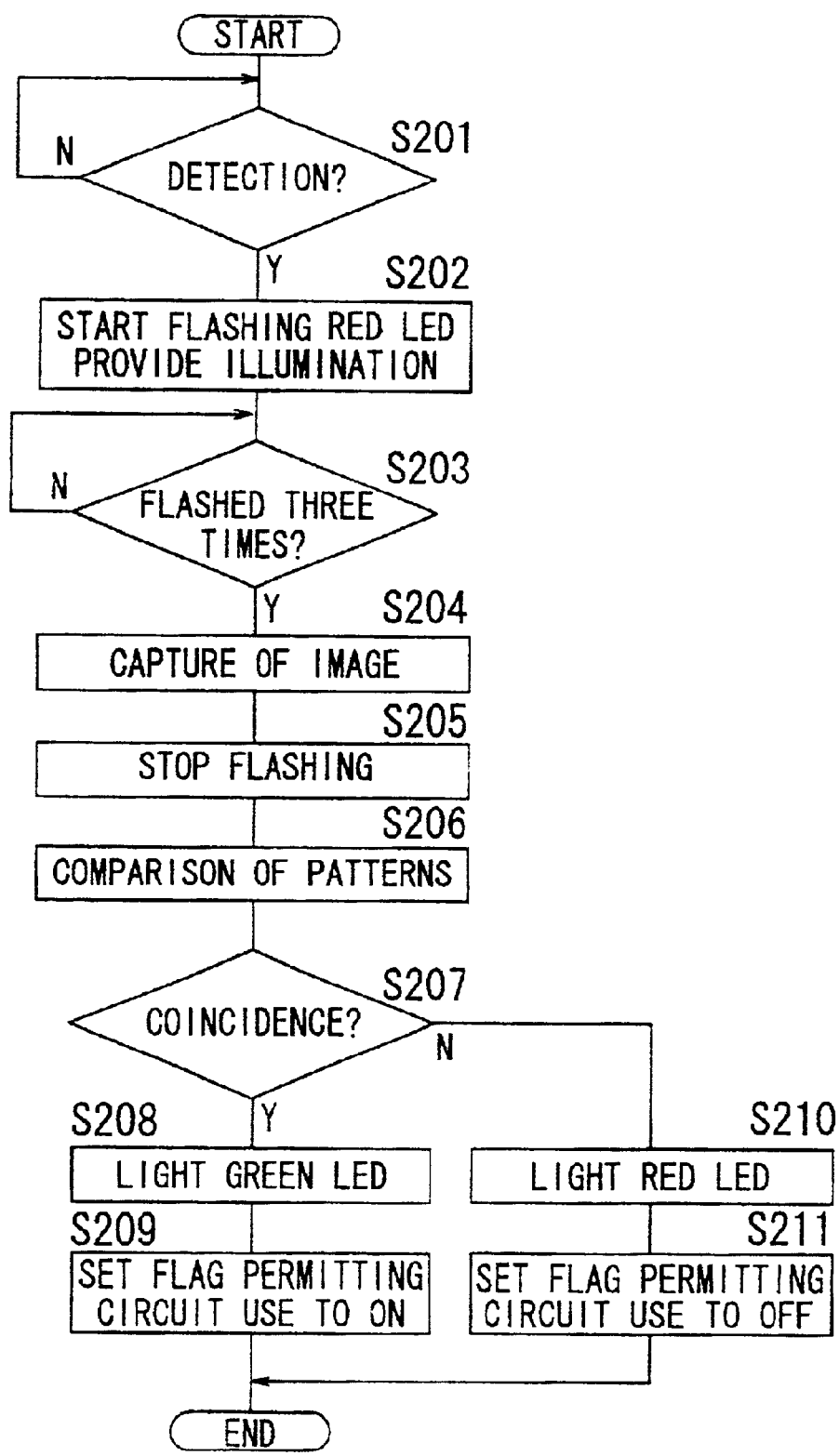
FIG. 8 is a flowchart showing the operation of comparing a fingerprint before use of a portable telephone according to the first embodiment of the present invention.

FIG. 8 is a flowchart illustrating the operation of verifying a fingerprint before the portable telephone 101 of this embodiment is used. In the waiting condition in which normal circuitry within the portable telephone 101 is not operating, the input circuit 178 shown in FIG. 7 waits for the sensor 179 to detect pressure from the finger 131 (step S201). When the sensor 179 detects pressure (yes result), the CPU 171 commands the LED drive circuit 183 to flash the LED 123 shown in FIG. 2 red. Simultaneously with this, the other LED 133 shown in FIG. 4 are lighted, and illumination for capturing the image of the fingerprint is performed (step S202). The red flashing of the LED 123 is performed at a prescribed period. At the occurrence of the third flash of the LED 123 (step S203), the image output from the imaging element 143 is captured (step S204). Thus, the owner of the portable telephone 101 knows that on the third flash of the LED 123 the image is captured, and at this point keeps the finger 131 stationary on the transparent plastic plate 122.

When the capturing of the image for fingerprint verification is completed in this manner, the two types of LEDs 123 and 133 are extinguished (step S205), and the operation of verification of the captured image is started (step S206). When this is done, pattern matching is performed between the captured pattern and a pattern of the user's finger 131 that has been priorly stored in the ROM 173. If the pattern resemblance is higher than a certain value, the patterns are treated as having coincided. If such coincidence occurs (step S207), the LED 123 lights green for a prescribed amount of time (for example 5 seconds, at step S208). Then, a flag that permits use of the circuitry of the portable telephone 101 is set to on for a prescribed amount of time (step S209). Therefore, during the time which this flag is on, it is possible to use the portable telephone 101.

In the case in which the portable telephone 101 is used to perform television telephone communication, image information for a face and scenery and voice information are compressed and multiplexed, this information being sent to the other party to the call, and compressed information from the other party is demodulated to obtain image and voice information.

There was no coincidence between the fingerprint patterns, when the sensor 179 malfunctions for some external reason (step S207). If this occurs, the LED 123 lights red for a prescribed amount of time (for example 5 seconds) to indicate an error (step S210). In this case, because use of the circuit is not permitted, the flag permitting use of the circuit is set to off (step S211). With this flag se to the off condition, unless another attempt to verify the fingerprint is made, it will not be possible to use the portable telephone 101.

In the portable telephone according to this embodiment, it is not possible to make a telephone call or to send or receive data with the flag that permits circuit operation in the off condition. Thus, unless the LED 123 lights green for the prescribed amount of time, it is not possible for the user to make use of the portable telephone 101, thereby protecting the security thereof.

Figure 9:
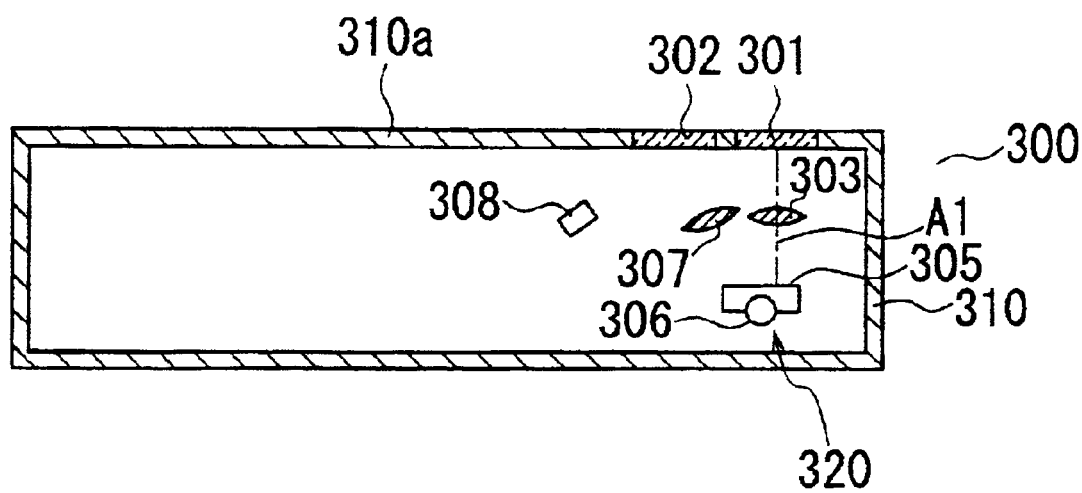
FIG. 9 is a cross-sectional view showing the main parts of the configuration of a portable telephone according to a second embodiment of the present invention.

FIG. 9 shows a portable telephone used as a portable information terminal according to a second embodiment of the present invention. This portable telephone 300 has a first glass plate 301 and a second glass plate 302, disposed so as to be adjacent on the end part (right edge in the drawing) of the upper surface on which the operating section with dialing buttons and the like (not shown in the drawing) is provided. The first glass plate 301 is a flat glass plate for passing light rays for imaging the face of a user of the portable telephone 300 or scenery, and the second glass plate 302 is a flat glass plate for capturing a fingerprint of the user. The portable telephone 300 of this embodiment, in contrast to the first embodiment, is of non-folding construction.

Inside the portable telephone 300, a first lens 303 is disposed immediately below and parallel to the first glass plate 301, and an imaging element 305 is disposed at the focal point of this first lens 301. The imaging element 305 is mounted to a rotating shaft 306, and is free to rotate through a prescribed angle. A second lens 307 and an LED 308 for illumination are disposed below the second glass plate 302. The LED 308 is disposed so that the light emitted therefrom strikes the second glass plate 302. The second lens 307 has an light axis that is inclined with respect to the light axis of the first lens 303, so that light rays from the second glass plate 302 are formed in the direction of the imaging element 305.

By rotating a knob (not shown in the drawing) provided on the side part of the portable telephone 300, the rotating shaft 306, as shown in FIG. 9, can set the imaging surface of the imaging element 305 to either a first rotational position perpendicular to the light rays from the first lens 303, or to a second rotational positional perpendicular to the light rays from the second lens 307. The first lens 303 is a convex lens having a focal length longer than that of the second lens 307, and can be used to form an image of a user's face or scenery positioned in front of the first glass plate 301.

Figure 10:
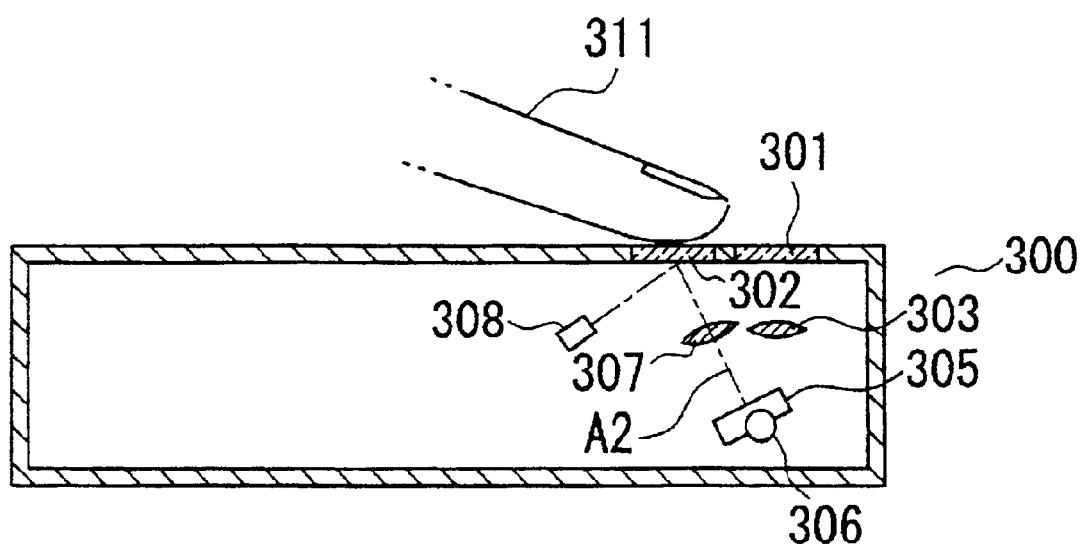
FIG. 10 is a cross-sectional view of a portable telephone according to the second embodiment of the present invention, showing the condition in which a fingerprint is compared.

FIG. 10 shows the portable information terminal of this embodiment in the condition in which a fingerprint is being verified. The user rotates the above-noted knob so as to set the imaging surface of the imaging element 305 so that it is perpendicular to the light rays from the second lens 307. The user then places the tip of the finger 311 lightly against the glass plate 302 and presses a button (not shown in the drawing). When this is done, processing starts in order to verify the fingerprint, the LED 308 lighting and an image of the fingerprint being formed on the imaging surface of the imaging element 305 via the second lens 305. In the case in which the imaging element 305 is still at the first rotational position, an error display is made on a display part (not shown in the drawing) when the above-noted button is pressured to attempt a fingerprint verification. Because the circuitry for fingerprint verification is the same as in the first embodiment, it has been omitted from the drawing and not explicitly described herein.

Figure 11:
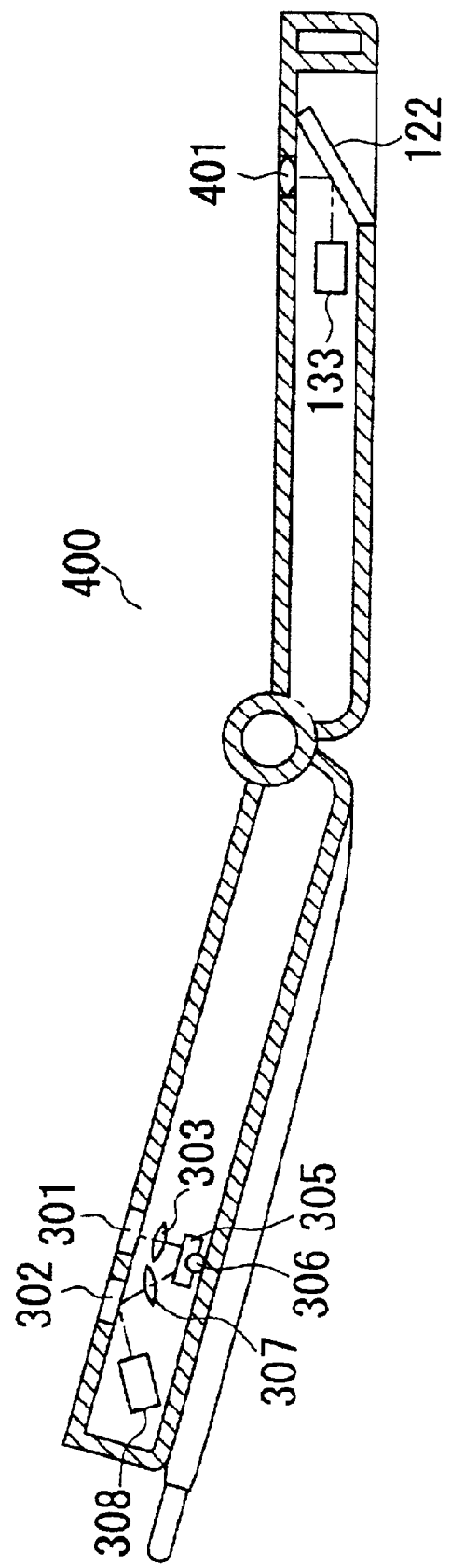
FIG. 11 is a cross-sectional view of a portable telephone used as a portable information terminal according to a third embodiment of the present invention.
Figure 12:
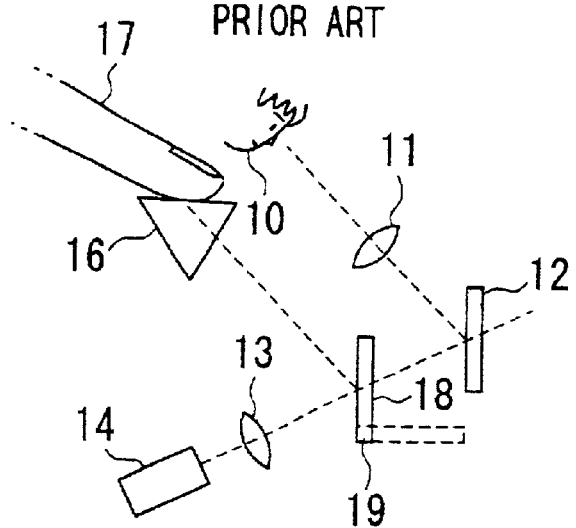
FIG. 12 is a drawing showing a first general configuration of a conventional optics system showing performing checking of a face and a fingerprint to identify a user.
Figure 13:
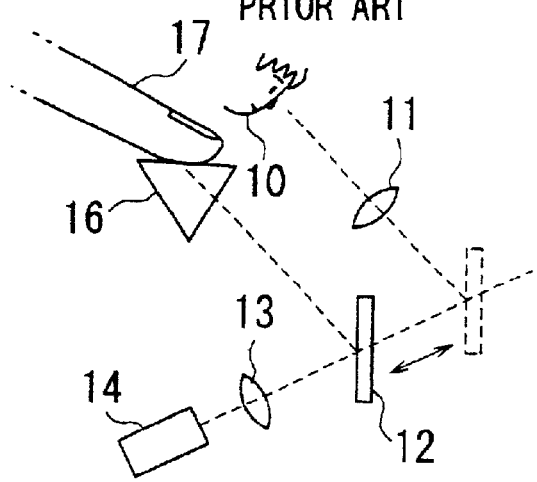
FIG. 13 is a drawing showing a second general configuration of a conventional optics system showing performing checking of a face and a fingerprint to identify a user.
Figure 14:
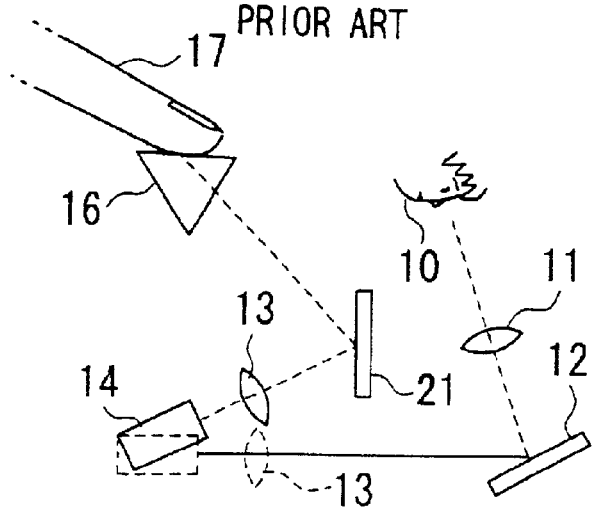
FIG. 14 is a drawing showing a third general configuration of a conventional optics system showing performing checking of a face and a fingerprint to identify a user.

FIG. 11 shows a portable information terminal serving as a portable telephone according to a third embodiment of the present invention. The portable telephone 400 according to this embodiment can be understood as a combination of the first embodiment and the second embodiment, this being a folding-type portable telephone which enables fingerprint verification in the unfolded condition. Because of this relationship to the above-described embodiments, elements of the third embodiment corresponding to elements of first embodiment shown in FIG. 1 are assigned the same reference numerals as in that drawing, and elements of the third embodiment corresponding to elements of the second embodiment shown in FIG. 10 are assigned the same reference numerals as in that drawing. In the portable telephone 400 of the third embodiment, it is possible in the opened condition shown in the drawing, to form an image of a face or scenery by causing the rotating shaft 306 to operate so as to set the imaging element 305 to the first rotational position. It is further possible in the opened condition to verify a fingerprint, by setting the imaging element 305 to the second rotational position.

With the portable telephone 400 in the folded condition, the imaging element 305 is set at the first rotational position, by bringing a finger up against the transparent plastic plate 122 such as shown in FIG. 4, light rays emitted from the LED 133 illuminate the fingerprint, this light passing through the convex lens 401 and the first glass plate 301 so as to reach the first lens 303, forms a fingerprint image on the imaging element 305. The convex lens 401 is used in combination with the long-distance first lens 303, this having the effect of shortening the focal length for imaging of the fingerprint. Because the circuitry for fingerprint verification is the same as in the first embodiment, it has been omitted from the drawing and not explicitly described herein.

Although the foregoing first, second, and third embodiments are described for the case in which the transparent material is plastic, it will be understood that the present invention is not restricted in this manner, and can use other appropriate transparent materials, the same being true of the lens material as well. Additionally, although in the first embodiment the lens switching is performed automatically in concert with the opening and folding of the portable telephone, it will be understood that it is alternately possible to have the user employ a sliding mechanism to manually switch the lens. In the same manner, although the second and third embodiments are described for the case in which the imaging element rotational position is manually switched, it is alternately possible in these embodiment to have this switching operation performed automatically.

According to the present invention, by providing two lenses having mutually different focal lengths in a portable telephone with a single imaging element and selecting one of these two lenses for imaging, it is possible to form images from different types of objects, such as a face and a finger, using a single imaging element. This enables the achievement of an economical portable information terminal.

According to the present invention, in a portable information terminal having a first enclosure and a second enclosure that can be freely opened and closed about a hinge mechanism, because the object of a second lens is imaged when the first and second enclosures are in the closed condition, and the object of a first lens is imaged when the first and second enclosures are in the open condition, if the second lens is used to perform such processing as the verification of a proper user by means of a fingerprint, it is possible to obtain the portable information terminal device with improved ease of use.

Additionally, according to the present invention, because the two lenses are automatically positioned in response to the opening and closing of the first enclosure and second enclosure, it is possible to achieve a terminal free from misoperation.

What is claimed is:

1. A portable information terminal device comprising:
a first enclosure and a second enclosure of said portable information terminal device freely openable and closable about a hinge mechanism;
an imaging element provided within said first enclosure;
a first lens provided within said first enclosure for said imaging element;
a second lens, a focal length of which being shorter than that of said first lens provided within said first enclosure for said imaging element;
a lens selection means, provided within said first enclosure, which, in response to an opening and a closing operation of said first and second enclosures, selects one of said first lens and said second lens, so that, in an open condition a focal point of said first lens is established at said imaging element, and in a closed condition a focal point of said second lens is established at said imaging element; and
a transparent plate, provided on said second enclosure, to which a tip of a finger of an user of said portable information terminal device is attached;

wherein said imaging element captures an image of a fingerprint of said tip of the finger on said transparent plate by said second lens selected by said lens selection means.

2. A portable information terminal device comprising:

a first enclosure and a second enclosure of said portable information terminal device freely openable and closable about a hinge mechanism;

an imaging element provided within said first enclosure;

a first window provided on a front surface of said second enclosure for said imaging element and having a keyboard thereon;

a first lens provided within said first enclosure for said imaging element;

a second lens, a focal length of which being shorter than that of said first lens, provided within said first enclosure for said imaging element;

a second window provided on a front surface of said first enclosure, said front surface thereof being opposite to said front surface of said second enclosure, when both of said enclosures being attached to each other; and a transparent plate, to which a tip of a finger of an user of said portable information terminal device is attached, being positioned on a back surface of said second enclosure so as to oppose to said first window;

wherein said transparent plate, said first window, said second lens and said imaging element are arranged in one row when said first and second enclosures are contacted to each other to form a closed condition.

3. The portable information terminal device according to claim 2, wherein a lens selection means is provided within said first enclosure, said lens selection means causes said first and second lenses to be moved in response to an opening and a closing operation of said first and second enclosures, so that said lens selection means establishes a focal point of said first lens on said imaging element when both enclosures are in an open condition, and when both enclosures are in a closed condition, a focal point of said second lens is established at said imaging element.

4. The portable information terminal device according to claim 2, wherein said first lens is disposed between said second window and said imaging element when said first and second enclosures are in an open condition.

5. The portable information terminal device according to claim 2 wherein said transparent plate is disposed within a depression provided on said rear surface of said second enclosure.

6. The portable information terminal device according to claim 2 wherein a LED for illuminating said tip of the finger on said transparent plate is provided in a vicinity of said transparent plate.

7. The portable information terminal device according to claim 2, wherein said first lens is a lens for forming an image of an object disposed outside said first enclosure onto said imaging element.

8. The portable information terminal device according to claim 2, said device further comprising:

a pattern comparison means which compares a pattern of said fingerprint captured by said imaging element with a pattern stored prior in a memory; and a releasing means, which, only when said pattern comparison means detects that said patterns coincide with each other, releases a prohibition on processing of a prescribed signal processing operation.

9. The portable information terminal device according to claim 2, wherein said device is a portable telephone apparatus.

10. The portable information terminal device according to claim 2, wherein said device is a portable computer.

* * * * *